(12) United States Patent
Stout

(10) Patent No.: US 9,200,817 B2
(45) Date of Patent: Dec. 1, 2015

(54) SEASONALLY ADJUSTING APPARATUS FOR COLLECTING SOLAR THERMAL ENERGY

(76) Inventor: Robert Anthony Stout, Embudo, NM (US)

( * ) Notice: Subject to any disclaimer, the term of this patent is extended or adjusted under 35 U.S.C. 154(b) by 920 days.

(21) Appl. No.: 13/292,748

(22) Filed: Nov. 9, 2011

(65) Prior Publication Data

US 2012/0111317 A1    May 10, 2012

Related U.S. Application Data

(60) Provisional application No. 61/411,560, filed on Nov. 9, 2010.

(51) Int. Cl.
| | | |
|---|---|---|
| *F24J 2/38* | (2014.01) |
| *F24J 2/10* | (2006.01) |
| *F24J 2/16* | (2006.01) |
| *F24J 2/18* | (2006.01) |
| *F24J 2/46* | (2006.01) |
| *F24J 2/52* | (2006.01) |

(52) U.S. Cl.
CPC .... *F24J 2/16* (2013.01); *F24J 2/18* (2013.01); *F24J 2/38* (2013.01); *F24J 2/4623* (2013.01); *F24J 2/523* (2013.01); *Y02E 10/47* (2013.01)

(58) Field of Classification Search
CPC ............. F24J 2/38; F24J 2/523; F24J 2/4623; F24J 2/16; F24J 2/18
USPC .......................................... 126/600, 684, 696
See application file for complete search history.

(56) References Cited

U.S. PATENT DOCUMENTS

| | | | |
|---|---|---|---|
| 4,020,827 A | | 5/1977 | Broberg |
| 4,233,916 A | * | 11/1980 | Krieger ........................... 112/90 |
| 4,266,179 A | | 5/1981 | Hamm |
| 4,421,104 A | | 12/1983 | Adcock |
| 4,597,377 A | | 7/1986 | Melamed |
| 2009/0000613 A1 | | 1/2009 | Edwards et al. |
| 2009/0056698 A1 | | 3/2009 | Johnson et al. |

FOREIGN PATENT DOCUMENTS

| | | | | |
|---|---|---|---|---|
| DE | 4218403 A1 | * | 10/1992 | ................. F24J 2/18 |
| WO | WO2007109900 A1 | | 10/2007 | |
| WO | WO2009105268 A2 | | 8/2009 | |

* cited by examiner

*Primary Examiner* — William G Corboy

(57) ABSTRACT

The seasonally adjusting apparatus for collecting solar thermal energy comprises a solar thermal collector, a top panel, a bottom panel, and a frame. The solar thermal collector absorbs sunlight to produce thermal energy. The top panel and the bottom panel are positioned on opposite sides of the solar thermal collector and regulates how much sunlight is absorbed by the solar thermal collector during each season. The top panel and the bottom panel each have a shading surface and a reflecting surface. The shading surface casts a shadow over the solar thermal collector during the summer months when the sun's position is higher in the sky. The reflecting surface bounces more sunlight onto the solar thermal collector during the winter months when the sun's position is lower in the sky. The frame properly positions each component so that the solar thermal collector absorbs the appropriate amount of sunlight during each season.

14 Claims, 6 Drawing Sheets

| Angle (deg) | Area (in.) | Area (%) | Energy (%) |
|---|---|---|---|
| 10 | 47.5 | 99 | 85 |
| 15 | 46.5 | 97 | |
| 20 | 45.0 | 94 | 81 |
| 25 | 43.5 | 90 | |
| 30 | 42.0 | 87 | 75 |
| 35 | 39.5 | 82 | |
| 40 | 37.0 | 77 | 65 |
| 45 | 34.0 | 71 | |
| 50 | 31.0 | 65 | 56 |
| 55 | 27.5 | 57 | |
| 60 | 24.0 | 50 | 38 |
| 65 | 20.0 | 42 | |
| 70 | 15.5 | 32 | 25 |
| 75 | 12.5 | 26 | |

SEASONALLY ADJUSTING APPARATUS FOR COLLECTING SOLAR THERMAL ENERGY

The current application claims a priority to the U.S. Provisional Patent application Ser. No. 61/411,560 filed on Nov. 9, 2010.

FIELD OF THE INVENTION

The present invention generally relates to an apparatus that is able to adjust the amount of sunlight absorbed by a solar thermal collector according to the seasonal position of the sun in the sky.

BACKGROUND OF THE INVENTION

Traditionally, the primary obstacle with collecting solar energy is how to absorb the optimal amount of solar energy as the sun's position in the sky changes with respect to the location on the Earth. Also, the path of the sun varies through the different seasons and, thus, makes the sun's position more difficult to track. The sun's position in the sky becomes a large factor when constructing an apparatus to harness solar energy. In order to obtain the optimal sunlight when the path of sun is at an overall lower angle in the sky during the winter months, the present invention provides a means to collect sunlight optimally and efficiently throughout the day. The objective of the present invention is to focus sunlight to a solar thermal collector during the winter months and to provide shade on the solar thermal collector during the summer months.

DETAIL DESCRIPTIONS OF THE INVENTION

All illustrations of the drawings are for the purpose of describing selected versions of the present invention and are not intended to limit the scope of the present invention.

Figure 1:
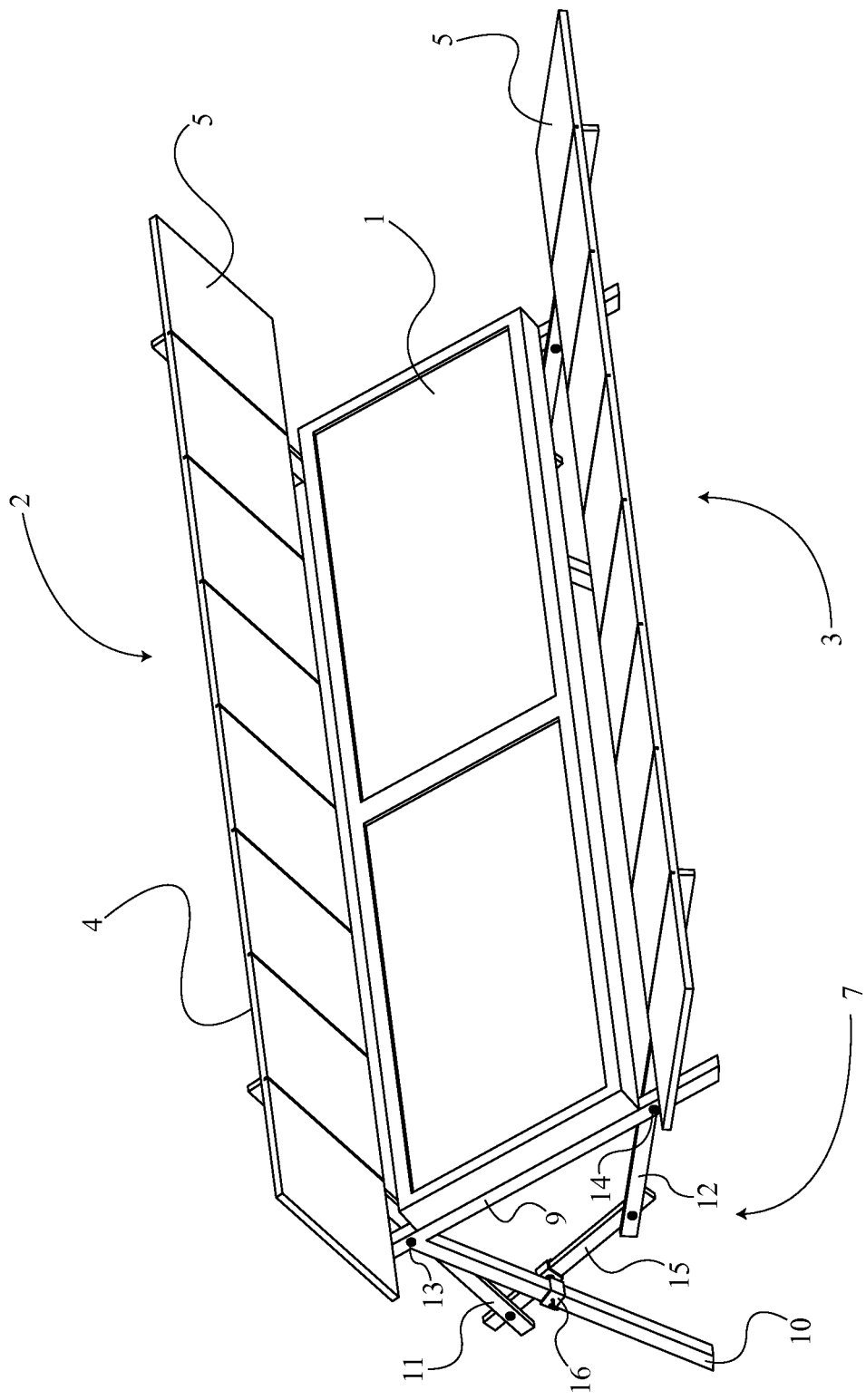
FIG. 1 is a front perspective view of the present invention.
Figure 2:
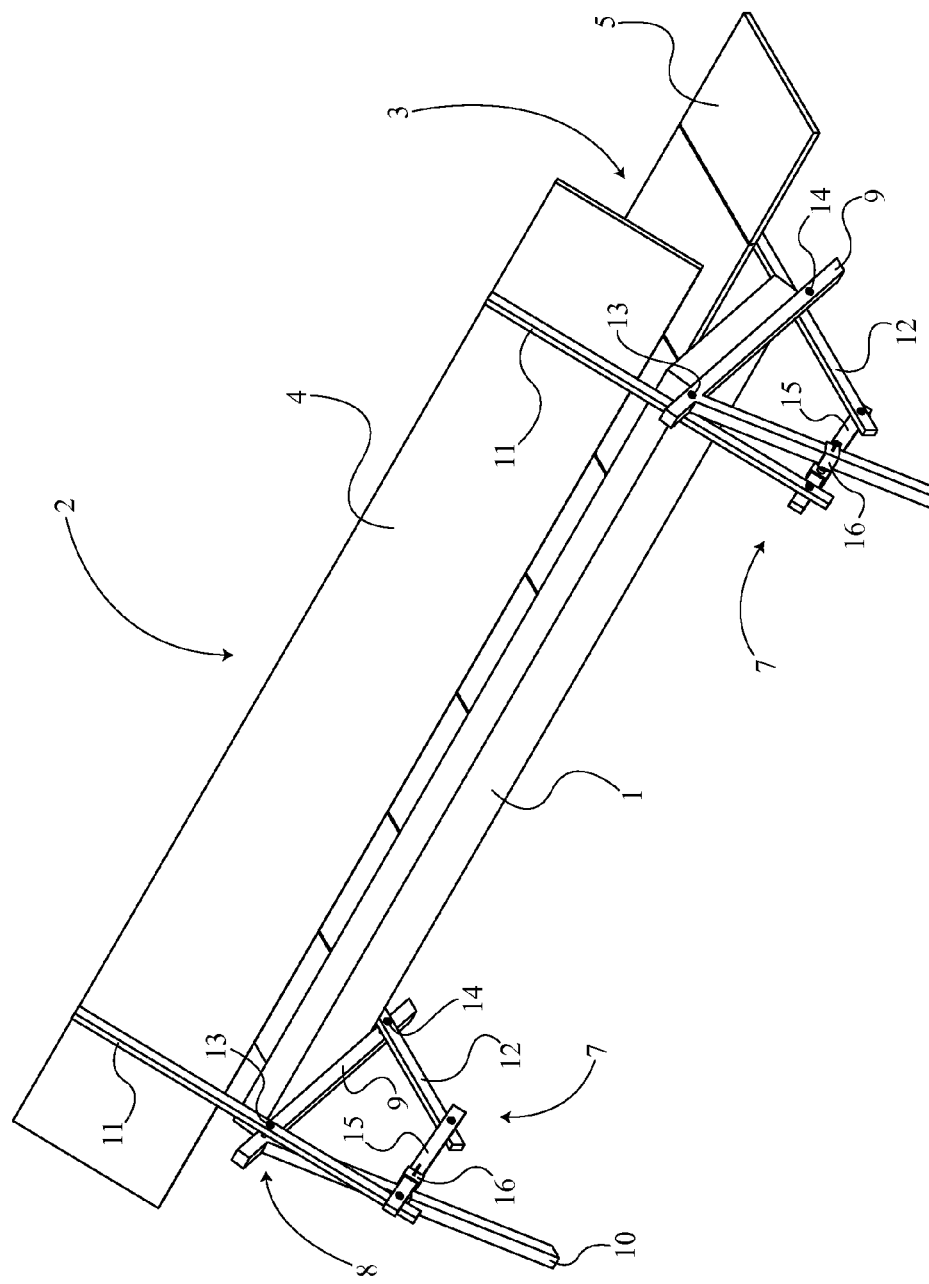
FIG. 2 is a back perspective view of the present invention.

The present invention is a seasonally adjusting apparatus for collecting solar thermal energy, which is used as an environmentally-friendly means to provide hot water and seasonal heating for a building. The present invention is shown in FIGS. 1 and 2. The present invention comprises a solar thermal collector 1, a top panel 2, a bottom panel 3, and a frame 6. The solar thermal collector 1 allows the present invention to collect heat by absorbing sunlight. The top panel 2 and the bottom panel 3 can be used to reflect more sunlight into the solar thermal collector 1 and to deflect sunlight away from the solar thermal collector 1. The frame 6 properly positions the solar thermal collector 1, the top panel 2, and the bottom panel 3 together so that each component is able to optimally perform their function.

The solar thermal collector 1 converts the electromagnetic radiation from the sun into a usable form of energy. Typically, the solar thermal collector 1 will consist of four major parts: a dark flat plate to absorb the electromagnetic radiation, a transparent cover to reduce heat losses, a fluid to transfer heat out of the solar thermal collector 1, and an insulation backing to further prevent heat losses. The solar thermal collector 1 is positioned to face north in the southern hemisphere and is positioned to face south in the northern hemisphere. The solar thermal collector 1 is angled back at 15 to 20 degrees plus the latitudinal angle of the present invention's position on the Earth. For example, the solar thermal collector 1 is angled back at 52 to 57 degrees in Santa Fe, N. Mex.

Figure 3:
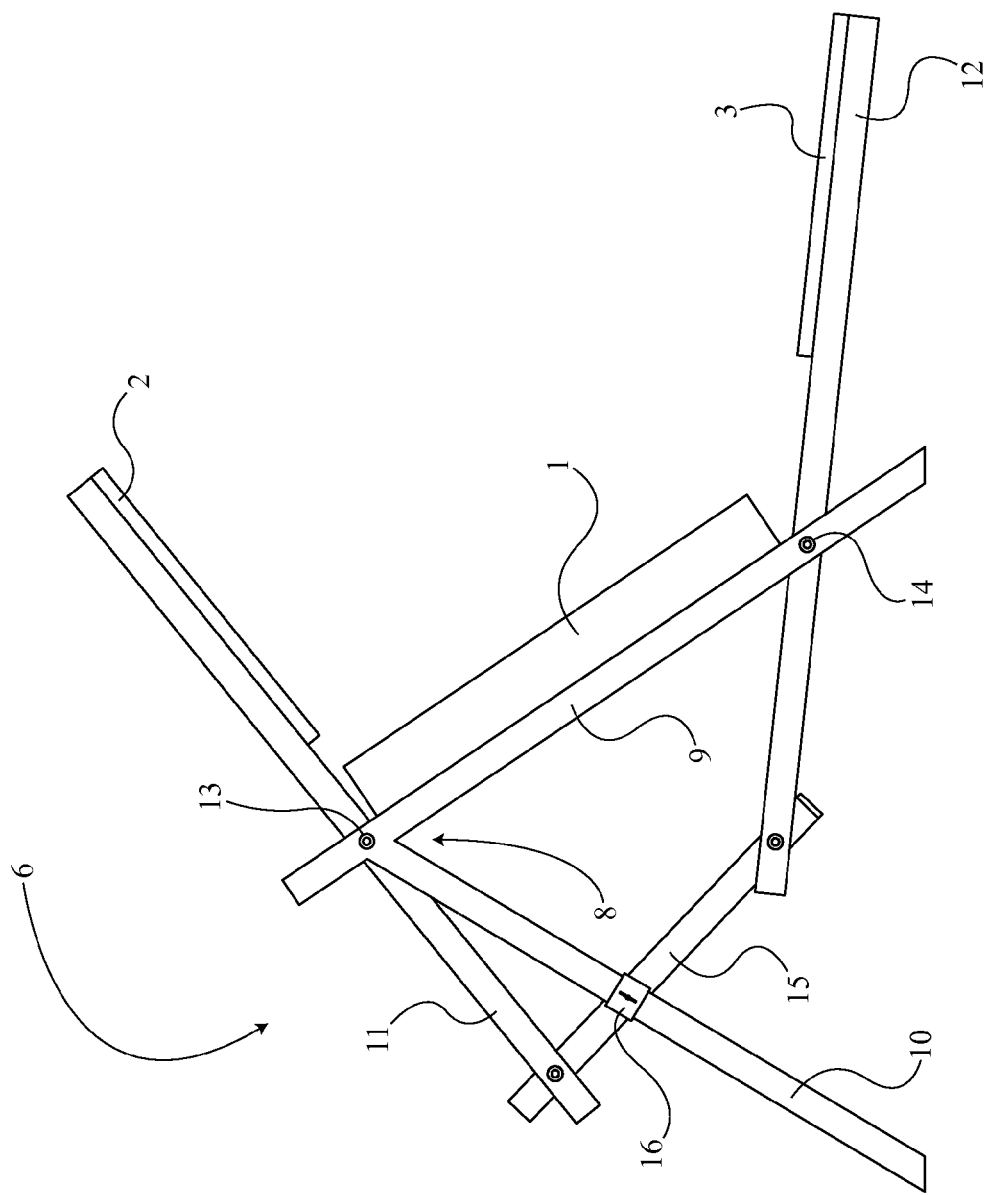
FIG. 3 is a side view of the present invention.

As can be seen in FIG. 3, the solar thermal collector 1 is angled back in order to absorb the maximum amount of solar energy, which may overheat the solar thermal collector 1 during the summer months and may not provide enough heat during the winter months. The top panel 2 and the bottom panel 3 are used to adjust the amount of sunlight that is absorbed by the solar thermal collector 1. The top panel 2 is positioned adjacent to the top edge of the solar thermal collector 1, and the bottom panel 3 is positioned adjacent to the bottom edge of the solar thermal collector 1. The top panel 2 and the bottom panel 3 each comprise a shading surface 4 and a reflecting surface 5. For both the top panel 2 and the bottom panel 3, the shading surface 4 is located on the opposite side of the reflecting surface 5. The top panel 2 is positioned in such a way that the reflecting surface 5 of the top panel 2 is angled towards the solar thermal collector 1. Similarly, the bottom panel 3 is also positioned in such a way that the reflecting surface 5 of the bottom panel 3 is angled towards the solar thermal collector 1. The reflecting surface 5 of both the top panel 2 and the bottom panel 3 should be 94% efficient at reflecting sunlight, which will increase the sunlight collection area of the present invention. The reflecting surface 5 allows the solar thermal collector 1 to gather an adequate amount of heat during the winter months when sun is lower in the sky. The reflecting surface 5 should be at a 110 to 120 degree angle with the solar thermal collector 1 to achieve maximum absorption. The shading surface 4 of the bottom panel 3 is most likely pointed at the ground and does not serve a purpose. The shading surface 4 of the top panel 2 casts a shadow on the solar thermal collector 1 during the summer months when the sun is higher in the sky, which protects the solar thermal collector 1 from overheating. Both the top panel 2 and the bottom panel 3 should have a length equal to or greater than the length of the solar thermal collector 1 so that the reflecting surface 5 and the shading surface 4 can serve their purpose for the entire length of the solar thermal collector 1.

The frame 6 allows the present invention to position the top panel 2 and the bottom panel 3 around the solar thermal collector 1 so that the present invention does not absorb too much sunlight during the summer months or too little sunlight during the winter months. The frame 6 comprises a plurality of frame portions 7, which are attached along the length of the solar thermal collector 1, the top panel 2, and the bottom panel 3. The plurality of frame portions 7 allows the present invention to evenly support different areas of the solar thermal collector 1, the top panel 2, and the bottom panel 3.

Figure 4:
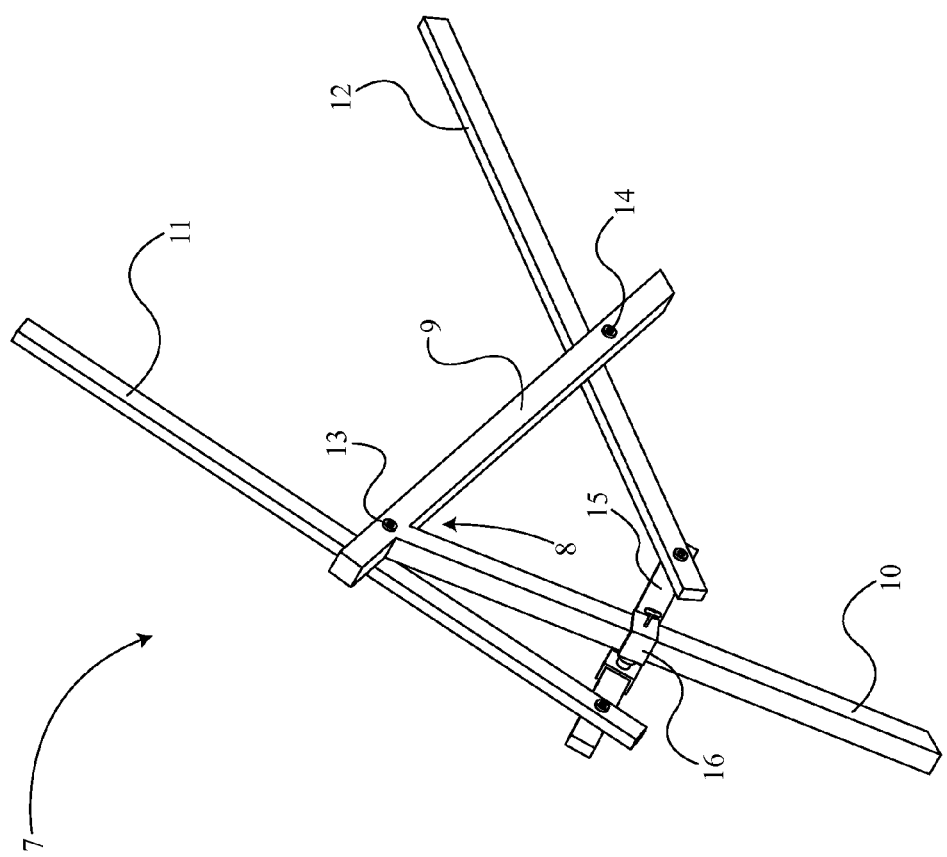
FIG. 4 is a perspective view of one of the frame portions on the present invention.

The plurality of frame portions 7 use a number of components to adjust the top panel 2 and the bottom panel 3 according to the angle of the sun in the sky. FIG. 4 illustrates that each of the plurality of frame portions 7 comprises a base structure 8, a first lever 11, a second lever 12, a first pivot 13, a second pivot 14, a connecting rod 15, and an adjustable clamp 16. The base structure 8 situates the present invention into the roof of a building or a structure and provides a base for all of the other components of the frame portion 7 to be attached together. The base structure 8 consists of a front leg 9 and a back leg 10. The front leg 9 is mounted to be angled back so that the solar thermal collector 1 is properly positioned to absorb sunlight. The front leg 9 is perpendicular to the length of the solar thermal collector 1 and is attached to the solar thermal collector 1. The back leg 10 intersects into the front leg 9 and braces the front leg 9 against the weight of the solar thermal collector 1. The first lever 11 is positioned adjacent to the solar thermal collector 1 and is attached to the front leg 9 with the first pivot 13. The first lever 11 changes the angle that the sunlight bounces off the reflective surface of the top panel 2, which is attached to one end of first lever 11. The first lever 11 also changes the size of the shadow that is casted by the shading surface 4 of the top panel 2. The first lever 11 is perpendicular to the length of the top panel 2. The first lever 11 moves about the first pivot 13 in order to properly angle the top panel 2. The other end of the first lever 11 is pivotally attached to the connecting rod 15.

Likewise, the second lever 12 is positioned adjacent to the solar thermal collector 1 and opposite of the first lever 11. The second lever 12 is attached to the front leg 9 with the second pivot 14. The second lever 12 changes the angle that the sunlight bounces off the reflective surface of the bottom panel 3, which is attached to one end of the second lever 12. The second lever 12 is perpendicular to the length of the bottom panel 3. The second lever 12 moves about the second pivot 14 in order to properly angle the bottom panel 3. The other end of the second lever 12 is pivotally attached to connecting rod 15. The first lever 11 and the second lever 12 are pivotally attached to opposite ends of the connecting rod 15. The connecting rod 15 allows the present invention to synchronize the movements of both the first lever 11 and the second lever 12 so that both the top panel 2 and the bottom panel 3 bounce the sunlight into the solar thermal collector 1 at the same angle. The adjustable clamp 16 is used to secure the connecting rod 15 to the back leg 10 in order to fix the angle that the sunlight bounces off the top panel 2 and the bottom panel 3. The adjustable clamp 16 allows a user to change the angle of the top panel 2 and the bottom panel 3 on a daily, monthly, or seasonal basis.

Figure 5:
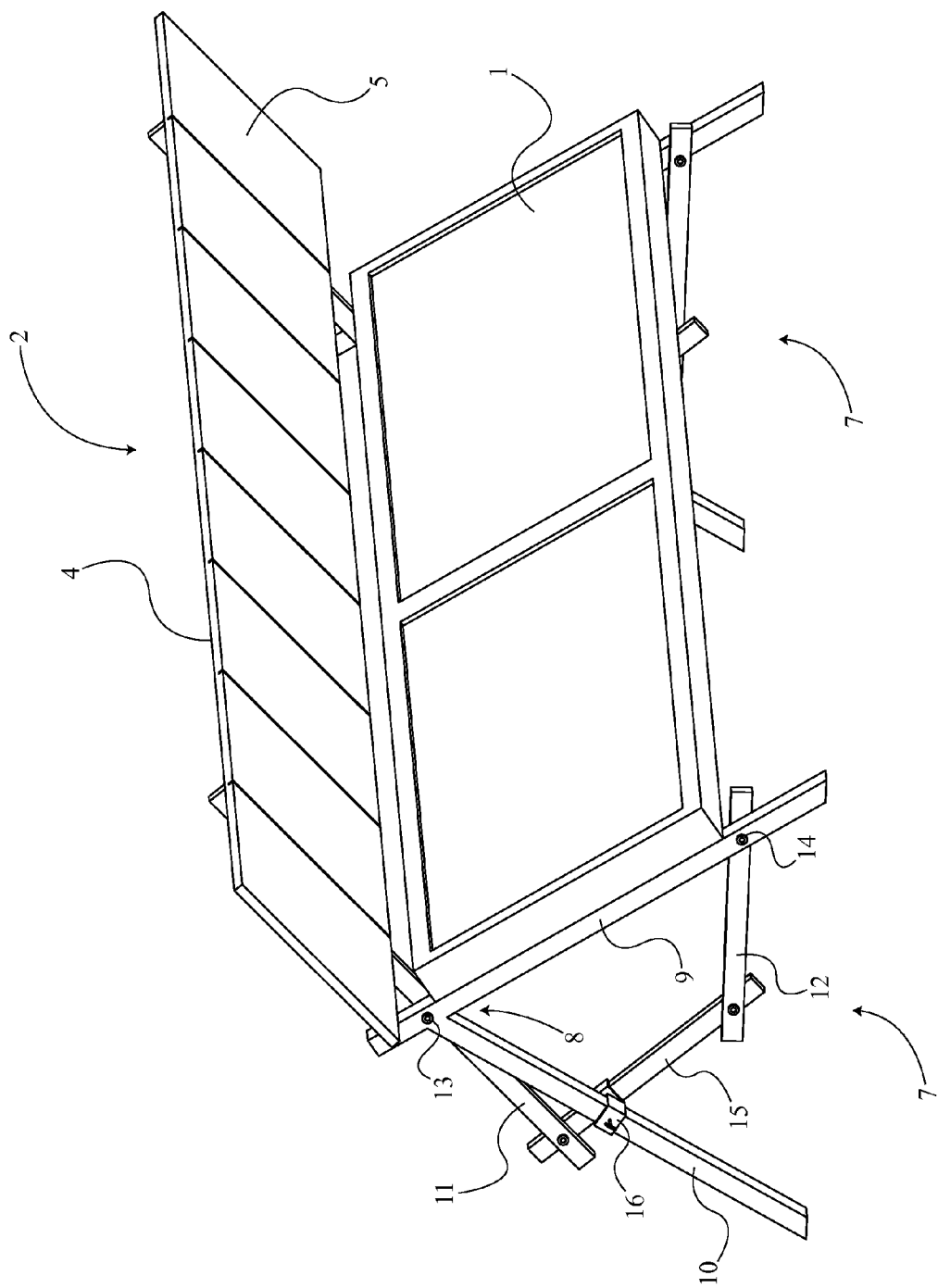
FIG. 5 is a front perspective view of the preferred embodiment of the present invention.
Figure 6:
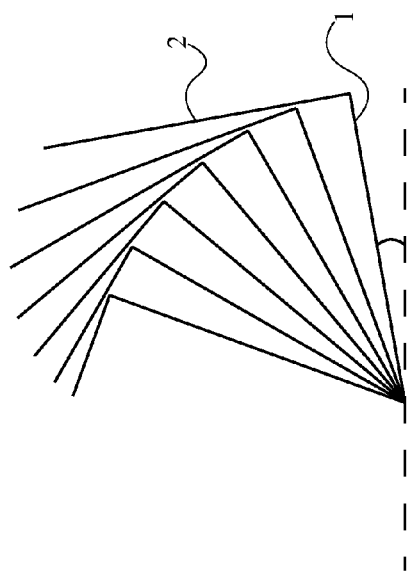
FIG. 6 is a table of some experimental values for the preferred embodiment of the present invention, which depicts the proportional or inversely proportional relationships between the angle that the solar thermal collector makes with the plane of the ground, the area of the solar thermal collector that is exposed to the sunlight, the percentage of total area of the solar thermal collector that is exposed to the sunlight, and the percentage of total energy that could be captured by the solar thermal collector.

The present invention, as described above, is the complete embodiment. In the preferred embodiment, the present invention does not comprise a bottom panel 3 and, thus, the second lever 12 does not extend past the second pivot 14. The preferred embodiment is shown in FIG. 5. The first lever 11 is still capable of angling the top panel 2 to increase the size of the shadow or to reflect more sunlight into the solar thermal collector 1. The adjustable clamp 16 is also still able to fix the angle of the top panel 2 by securing the connecting rod 15 to the back leg 10. The preferred embodiment reduces the material cost of the present invention while maintaining a majority of the present invention's functionality.

In another embodiment, the frame 6 of the present invention is completely rigid and does not have any moving components. The frame 6 simply cantilevers the top panel 2 over the solar thermal collector 1 at a constant angle between the reflecting surface 5 of the top panel 2 and the solar thermal collector 1. The benefits of this embodiment are that the present invention is relative cheaper to construct and maintain.

Although the invention has been explained in relation to its preferred embodiment, it is to be understood that many other possible modifications and variations can be made without departing from the spirit and scope of the invention as hereinafter claimed.

What is claimed is:

1. A seasonally adjusting apparatus for collecting solar thermal energy,
    a solar thermal collector;
    a top panel;
    a frame;
    said top panel comprises a shading surface and a reflecting surface;
    said frame comprises a plurality of frame portions;
    said solar thermal collector being attached onto said frame;
    said top panel being attached to said frame adjacent to said solar thermal collector;
    each of said plurality of frame portions being attached along said solar thermal collector and said top panel;
    each of said plurality of frame portions comprises a base structure, a first lever, a second lever, a first pivot, a second pivot, a connecting rod, and an adjustable clamp;
    said base structure comprises a front leg and a back leg;
    said first lever being positioned opposite of said second lever on said connecting rod; and
    said connecting rod being secured to said back leg by said adjustable clamp.

2. The seasonally adjusting apparatus for collecting solar thermal energy as claimed in claim 1 comprises,
    said shading surface of said top panel being positioned opposite of said reflecting surface of said top panel.

3. The seasonally adjusting apparatus for collecting solar thermal energy as claimed in claim 2 comprises,
    said reflecting surface of said top panel being angled towards said solar thermal collector.

4. The seasonally adjusting apparatus for collecting solar thermal energy as claimed in claim 1 comprises,
    said front leg being intersected by said back leg;
    said solar thermal collector being perpendicularly attached to said front leg;
    said first lever being positioned adjacent to said solar thermal collector;
    said first lever being attached to said front leg by said first pivot;
    said second lever being positioned adjacent to said solar thermal collector opposite of said first lever; and
    said second lever being attached to said front leg by said second pivot.

5. The seasonally adjusting apparatus for collecting solar thermal energy as claimed in claim 1 comprises,
    said top panel being perpendicularly attached to said first lever adjacent to said first pivot;
    said connecting rod being pivotally attached to said first lever adjacent to said first pivot and opposite of said top panel; and
    said connecting rod being pivotally attached to said second lever opposite of said second pivot.

6. A seasonally adjusting apparatus for collecting solar thermal energy,
    a solar thermal collector;
    a top panel;
    a frame;
    said top panel comprises a shading surface and a reflecting surface;
    said frame comprises a plurality of frame portions;
    said solar thermal collector being attached onto said frame;
    said top panel being attached to said frame adjacent to said solar thermal collector;

each of said plurality of frame portions being attached along said solar thermal collector and said top panel;
each of said plurality of frame portions comprises a base structure, a first lever, a second lever, a first pivot, a second pivot, a connecting rod, and an adjustable clamp;
said base structure comprises a front leg and a back leg;
said front leg being intersected by said back leg;
said solar thermal collector being perpendicularly attached to said front leg;
said first lever being positioned adjacent to said solar thermal collector;
said first lever being attached to said front leg by said first pivot;
said second lever being positioned adjacent to said solar thermal collector opposite of said first lever; and
said second lever being attached to said front leg by said second pivot.

7. The seasonally adjusting apparatus for collecting solar thermal energy as claimed in claim 6 comprises,
said shading surface of said top panel being positioned opposite of said reflecting surface of said top panel.

8. The seasonally adjusting apparatus for collecting solar thermal energy as claimed in claim 7 comprises,
said reflecting surface of said top panel being angled towards said solar thermal collector.

9. The seasonally adjusting apparatus for collecting solar thermal energy as claimed in claim 6 comprises,
said top panel being perpendicularly attached to said first lever adjacent to said first pivot;
said connecting rod being pivotally attached to said first lever adjacent to said first pivot and opposite of said top panel; and
said connecting rod being pivotally attached to said second lever opposite of said second pivot.

10. The seasonally adjusting apparatus for collecting solar thermal energy as claimed in claim 6 comprises,
said first lever being positioned opposite of said second lever on said connecting rod; and
said connecting rod being secured to said back leg by said adjustable clamp.

11. A seasonally adjusting apparatus for collecting solar thermal energy,
a solar thermal collector;
a top panel;
a frame;
said top panel comprises a shading surface and a reflecting surface;
said frame comprises a plurality of frame portions;
said solar thermal collector being attached onto said frame;
said top panel being attached to said frame adjacent to said solar thermal collector;
each of said plurality of frame portions being attached along said solar thermal collector and said top panel;
each of said plurality of frame portions comprises a base structure, a first lever, a second lever, a first pivot, a second pivot, a connecting rod, and an adjustable clamp;
said base structure comprises a front leg and a back leg;
said front leg being intersected by said back leg;
said solar thermal collector being perpendicularly attached to said front leg;
said first lever being positioned adjacent to said solar thermal collector;
said first lever being attached to said front leg by said first pivot;
said second lever being positioned adjacent to said solar thermal collector opposite of said first lever;
said second lever being attached to said front leg by said second pivot;
said top panel being perpendicularly attached to said first lever adjacent to said first pivot;
said connecting rod being pivotally attached to said first lever adjacent to said first pivot and opposite of said top panel; and
said connecting rod being pivotally attached to said second lever opposite of said second pivot.

12. The seasonally adjusting apparatus for collecting solar thermal energy as claimed in claim 11 comprises,
said shading surface of said top panel being positioned opposite of said reflecting surface of said top panel.

13. The seasonally adjusting apparatus for collecting solar thermal energy as claimed in claim 12 comprises,
said reflecting surface of said top panel being angled towards said solar thermal collector.

14. The seasonally adjusting apparatus for collecting solar thermal energy as claimed in claim 11 comprises,
said first lever being positioned opposite of said second lever on said connecting rod; and
said connecting rod being secured to said back leg by said adjustable clamp.

* * * * *